(12) United States Patent
Fukano et al.

(10) Patent No.: US 6,536,810 B2
(45) Date of Patent: Mar. 25, 2003

(54) STRUCTURE OF FLUID PASSAGE OUTPUT PORT OF FLUID-OPERATED APPARATUS

(75) Inventors: Yoshihiro Fukano, Ibaraki-ken (JP); Tadashi Uchino, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/796,361

(22) Filed: Mar. 2, 2001

(65) Prior Publication Data

US 2001/0019116 A1 Sep. 6, 2001

(30) Foreign Application Priority Data

Mar. 3, 2000 (JP) ........................................ 2000-059475

(51) Int. Cl.[7] .............................................. F16L 25/00
(52) U.S. Cl. ........................................ 285/328; 285/331
(58) Field of Search ................................ 285/331, 328, 285/334.1, 334.3, 9, 332.1, 332.4, 332, 353

(56) References Cited

U.S. PATENT DOCUMENTS

| | | | | |
|---|---|---|---|---|
| 2,017,362 A | * | 10/1935 | Werder ........................ 285/332 |
| 2,258,066 A | * | 10/1941 | Oyen .......................... 285/328 |
| 4,525,001 A | * | 6/1985 | Lumsden et al. ............ 285/328 |
| 5,553,900 A | * | 9/1996 | Fukumoto et al. .......... 285/331 |
| 5,769,465 A | * | 6/1998 | Schultz et al. .............. 285/328 |
| 5,779,224 A | * | 7/1998 | Fukano et al. .............. 251/331 |
| 5,996,636 A | | 12/1999 | Fukano et al. .............. 138/109 |
| 6,322,110 B1 | * | 11/2001 | Banker et al. .............. 285/333 |

FOREIGN PATENT DOCUMENTS

| | | |
|---|---|---|
| EP | 0 365 821 | 5/1990 |
| EP | 0 786 324 | 7/1997 |
| EP | 1 013 982 | 6/2000 |
| JP | 6-174171 | 9/1994 |
| JP | 10-267176 | 10/1998 |

* cited by examiner

Primary Examiner—Lynne H. Browne
Assistant Examiner—Aaron Dunwoody
(74) Attorney, Agent, or Firm—Paul A. Guss

(57) ABSTRACT

A structure of a fluid passage output port of a fluid-operated apparatus comprises a first valve body composed of a resin material and formed with a fluid passage for allowing a fluid to flow therethrough; and a fluid passage output member formed of a resin material to have a substantially cylindrical configuration separately from the first valve body and screwed into a hole of the first valve body by the aid of a male thread; wherein a primary seal portion which intersects an axis of the fluid passage output member and a secondary seal portion which is substantially parallel to the axis are provided at a connecting portion thereof.

4 Claims, 8 Drawing Sheets

STRUCTURE OF FLUID PASSAGE OUTPUT PORT OF FLUID-OPERATED APPARATUS

BACKGROUND OF THE INVENTION

1. Field of the Invention

The present invention relates to a structure of a fluid passage output port of a fluid-operated apparatus formed with the fluid passage output port communicating with a fluid passage for introducing and discharging a fluid.

2. Description of the Related Art

The fluid pressure circuit has been hitherto constructed, for example, by connecting a tube to a fluid-operated apparatus such as a valve and a pump, for example, with a tube joint. A fluid passage for allowing the fluid to flow therethrough is formed at the inside of the fluid-operated apparatus. A fluid passage output port, which communicates with the fluid passage, is formed to protrude toward the outside. In this arrangement, the tube is directly connected to the fluid passage output port, or the tube is connected by the aid of the tube joint. Accordingly, the fluid passage of the fluid-operated apparatus is connected to make communication with a fluid passage of another fluid-operated apparatus.

FIG. 7 shows a structure of a fluid passage output port of a fluid-operated apparatus concerning the conventional technique.

As clearly understood from FIG. 7, the fluid-operated apparatus 1 includes a main body section 3 which has a fluid passage 2 formed at the inside. A pair of fluid passage output ports 4a, 4b, which protrude coaxially outwardly, are provided at a first end and a second end of the main body section 3. In this arrangement, the pair of fluid passage output ports 4a, 4b are formed integrally with the main body section 3.

In another arrangement, as shown in FIG. 8, the following structure is adopted. That is, first ends of fluid passage output ports 7a, 7b, each of which is formed to have a tube-shaped configuration, are inserted and fitted to holes 6 which are formed at the side surface of a main body section 5. The connecting portions between the insert portions of the fluid passage output ports 7a, 7b and the main body section 5 are welded with resin to form resin-welded sections 8. Thus, the both components are connected to one another.

However, in the case of the structure of the fluid passage output port of the fluid-operated apparatus concerning the conventional technique shown in FIG. 7, the main body section 3 and the fluid passage output ports 4a, 4b are formed in an integrated manner by means of the cutting machining. Therefore, an inconvenience arises such that burrs formed during the cutting machining are broken and fall, and any dust or the like is generated. Further, another inconvenience arises such that the deterioration of the surface roughness of the machined surface subjected to the cutting machining results in formation of recesses which behave as liquid pools.

In order to dissolve the inconveniences caused by the cutting machining as described above, a method is conceived, in which the main body section 3 and the fluid passage output ports 4a, 4b are integrally produced by means of the resin molding based on the use of a mold. However, other problems arise as follows. That is, it is difficult to produce the mold, because the fluid passage output ports 4a, 4b are lengthy. Further, the fluid passage output ports 4a, 4b formed with resin may be deformed, and the dimension accuracy may be deteriorated.

In the case of the structure of the fluid passage output port of the fluid-operated apparatus concerning the conventional technique shown in FIG. 8, the resin-welded section 8 possesses both of the function to avoid the leakage of the fluid flowing through the fluid passage and the function to prevent the fluid passage output port 7a, 7b from disengagement. Therefore, the following inconvenience arises. That is, the load is concentrated on the resin-welded section 8, resulting in occurrence of the shortage of the connection strength and the deterioration of the durability.

SUMMARY OF THE INVENTION

A general object of the present invention is to provide a structure of a fluid passage output port of a fluid-operated apparatus, which avoids the dust and the liquid pool with a simple mechanism, which has a sufficient connecting strength, and which makes it possible to improve the durability.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
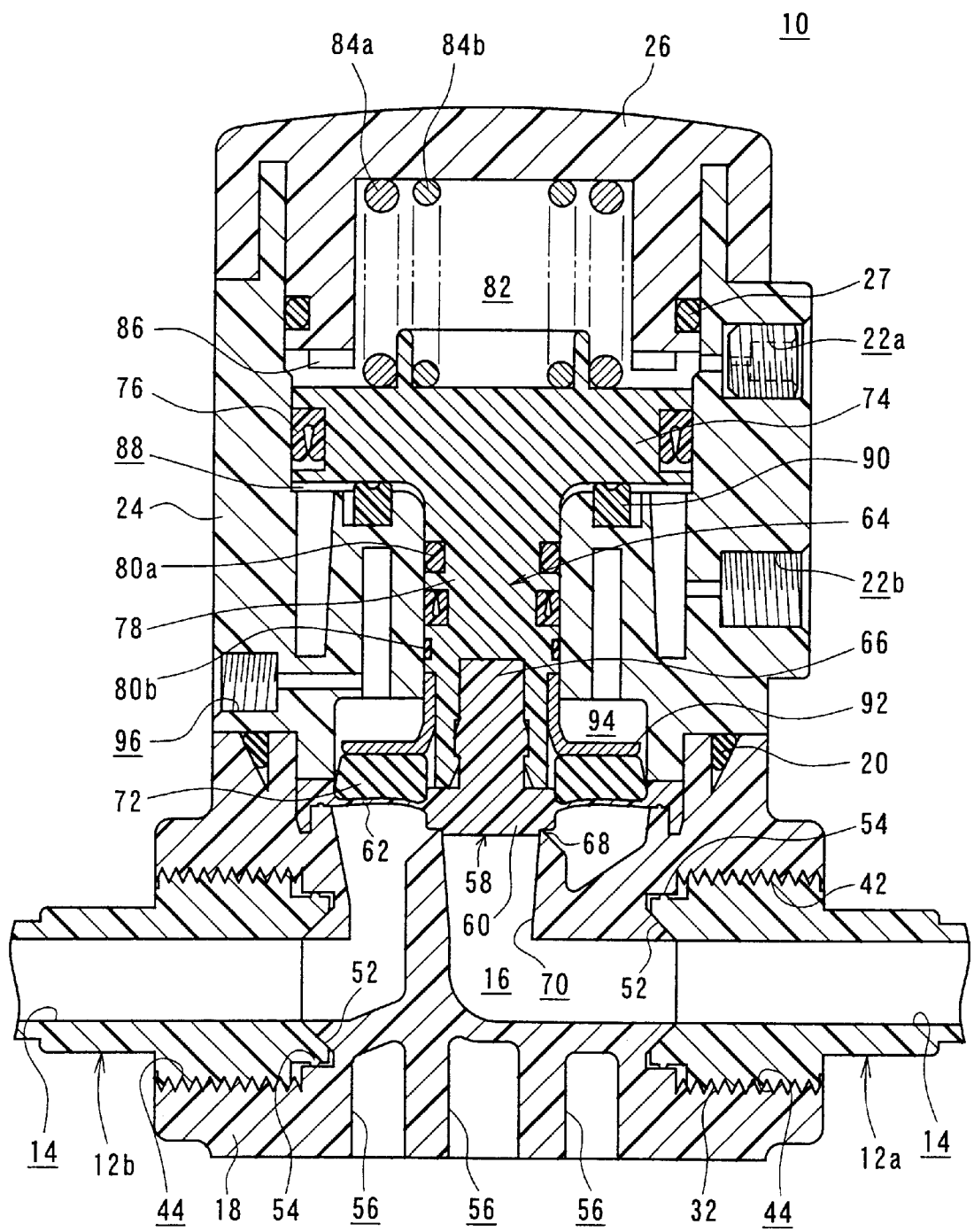
FIG. 1 shows a vertical sectional view taken along the axial direction illustrating an ON/OFF valve to which a structure of a fluid passage output port of a fluid-operated apparatus according to an embodiment of the present invention is applied.

With reference to FIG. 1, reference numeral 10 indicates an ON/OFF valve to which a structure of a fluid passage output port of a fluid-operated apparatus according to an embodiment of the present invention is applied.

The ON/OFF valve 10 comprises a first valve body 18 which includes a pair of fluid passage output members 12a, 12b fastened by screws respectively and protruding coaxially in mutually opposite directions and which has a fluid passage 16 formed at the inside to make communication between respective passages 14 of the pair of fluid passage output members 12a, 12b; a second valve body 24 which is connected in an air-tight manner to an upper portion of the first valve body 18 by the aid of an annular first seal member 20 and which is formed with a pair of pressure fluid inlet/outlet ports 22a, 22b separated from each other by a predetermined spacing distance; and a cover member 26 which is installed in an air-tight manner to an upper portion of the second valve body 24 by the aid of an annular second seal member 27.

Each of the pair of fluid passage output members 12a, 12b is formed to have an identical structure separately from the first valve body 18, and each of them is provided detachably with respect to the first valve body 18.

In this arrangement, it is preferable that each of the first valve body 18, the second valve body 24, and the cover member 26 is formed of fluororesin, and the fluid passage output member 12a, 12b is formed of polytetrafluoroethylene (PTFE).

Figure 2:
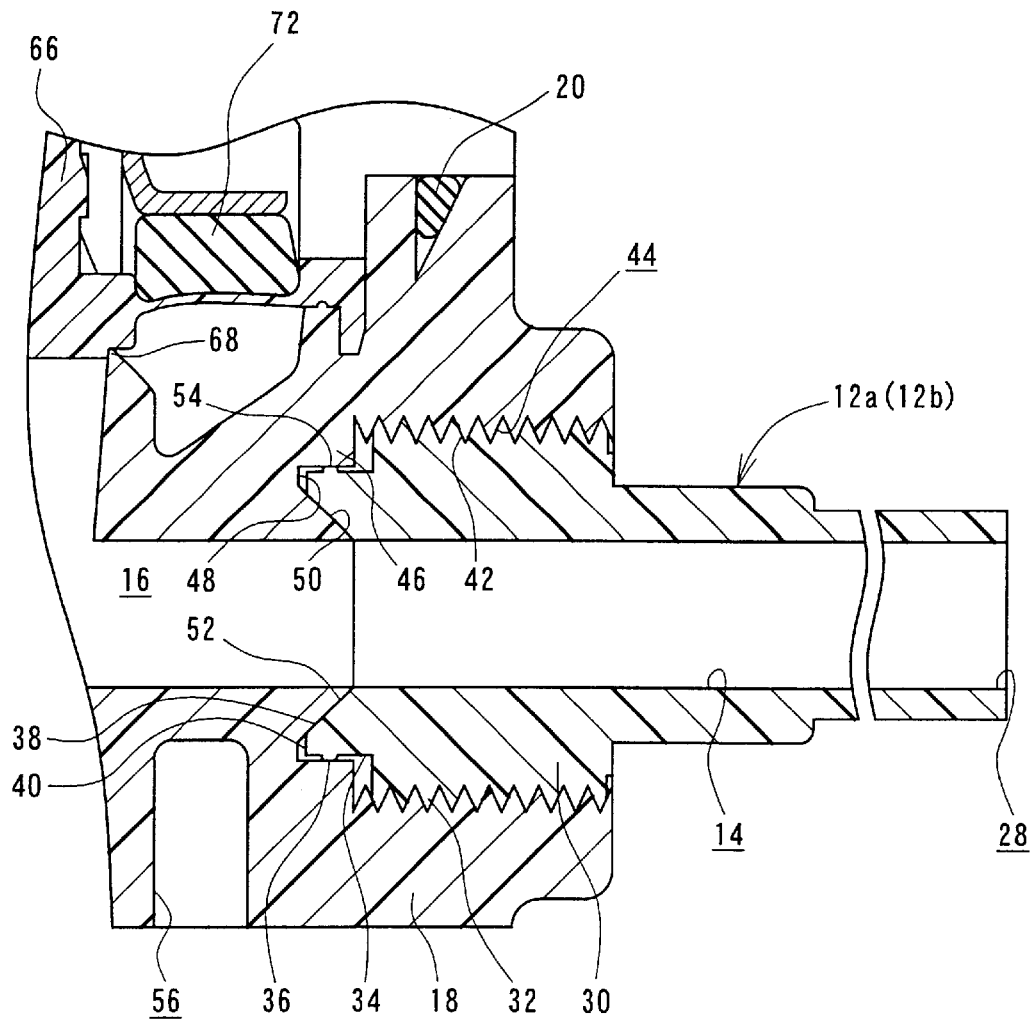
FIG. 2 shows, with partial omission, a magnified vertical sectional view illustrating a fluid passage output member for constructing the ON/OFF valve.
Figure 3:
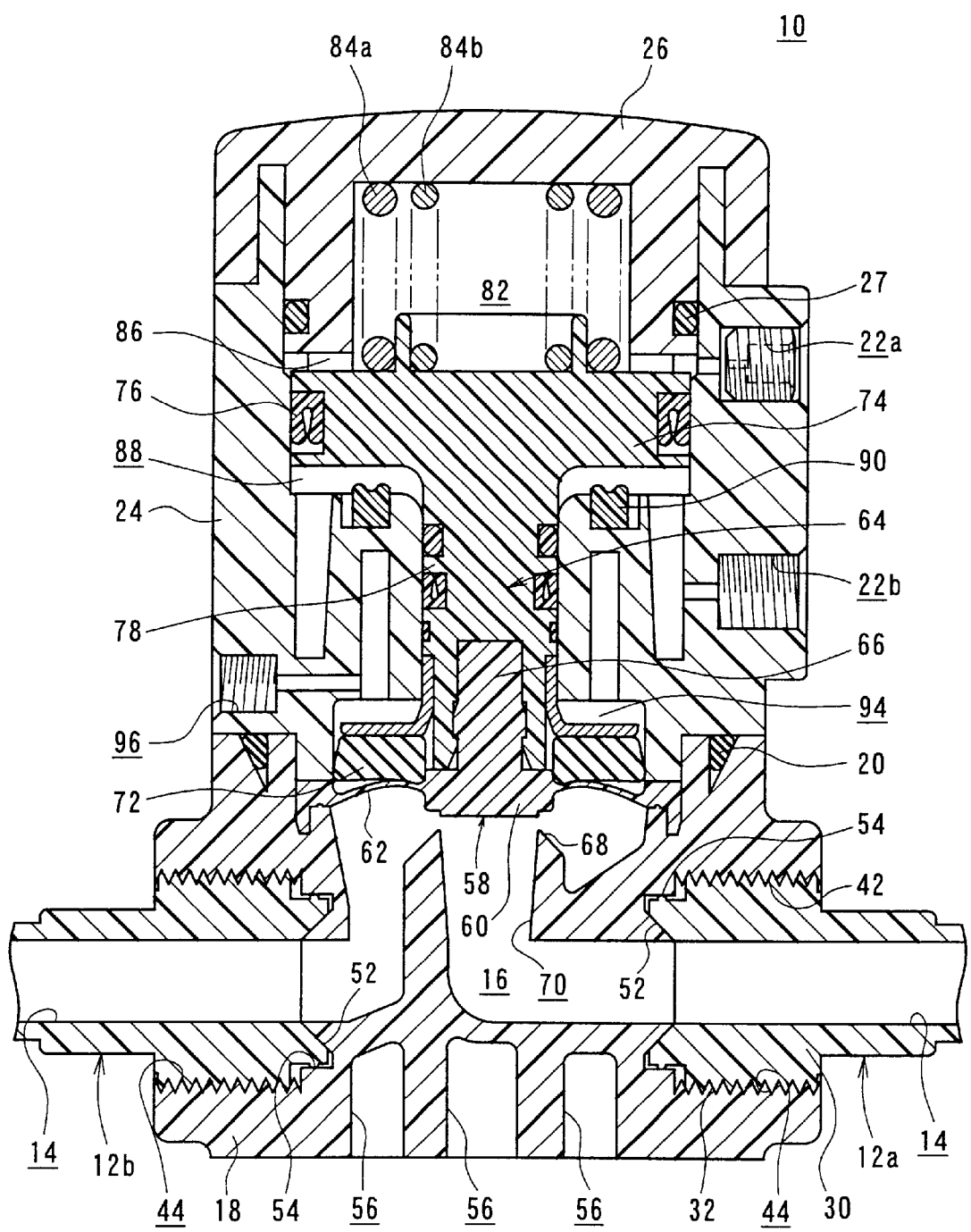
FIG. 3 illustrates the operation depicting the ON state achieved when a diaphragm is moved upwardly from the OFF state shown in FIG. 1.

As shown in FIG. 2, the fluid passage output member 12a (12b) has a substantially cylindrical configuration. A port 28, which functions as a fluid passage output port, is formed at the first end of the passage 14 penetrating in the axial direction. An annular bulge 30, which is expanded outwardly, is formed at the first end of the fluid passage output member 12a. A male thread 32 is formed on the outer circumferential surface of the annular bulge 30. An annular stepped section 34 is formed at a portion disposed closely to the male thread 32. An annular projection 36, which is formed to have a substantially semicircular cross section, is formed at the annular stepped section 34. A plurality of stripes of annular projections 36 as described above may be formed substantially in parallel to the axis of the fluid passage output member 12a.

The first end surface of the fluid passage output member 12a in the axial direction has a tapered surface 38 which is formed such that the diameter of its opening is gradually decreased in the radially inward direction, and a first annular flat section 40 which is formed substantially in parallel to the vertical plane.

As shown in FIG. 2, the first valve body 18 includes, on each of its mutually opposing side surfaces, a hole 44 which has, on its inner circumferential surface, a female thread 42 for being meshed with the male thread 32 of the fluid passage output member 12a, an annular stepped section 46 which is continued to the hole 44 and which is formed to expand by a predetermined length in the radially inward direction, a second annular flat section 48 which is continued to the annular stepped section 46 and which is formed to be opposed substantially in parallel to the first annular flat section 40 of the fluid passage output member 12a with a predetermined clearance intervening therebetween, and an inclined surface 50 which is continued to the second annular flat section 48 and which is formed by being inclined by a predetermined angle to intersect the axis of the fluid passage output member 12a.

When the fluid passage output member 12a, 12b is screw-fastened into the hole 44 of the first valve body 18 in accordance with the meshing action between the male thread 32 and the female thread 42, the inclined surface 50 of the first valve body 18 and the tapered surface 38 of the fluid passage output member 12a, 12b make pressed contact with each other to form a primary seal portion 52. Further, a secondary seal portion 54 is formed by making pressed contact of the top of the annular projection 36 of the fluid passage output member 12a, 12b with respect to the wall surface of the annular stepped section 46 of the first valve body 18.

In other words, the primary seal portion 52 is formed to make intersection by the predetermined angle with respect to the axis of the fluid passage output member 12a, 12b. The secondary seal portion 54 is formed to be substantially parallel to the axis of the fluid passage output member 12a, 12b.

In this arrangement, it is possible to reliably avoid any leakage of the pressure fluid flowing through the fluid passage 16 to the outside, owing to the cooperating action of the primary seal portion 52 and the secondary seal portion 54.

A plurality of cutouts 56 are formed at the bottom surface of the first valve body 18 in order to realize a light weight.

As shown in FIG. 1, a diaphragm 58 is interposed between the first valve body 18 and the second valve body 24. The diaphragm 58 comprises a thick-walled section 60 which is formed at a substantially circular central portion, a thin-walled section 62 which is formed at the outer circumferential surface of the thick-walled section 60, and a projection 66 which protrudes at the upper portion of the thick-walled section 60 and which is connected to a piston 64 by the aid of a pawl.

A seat section 68, on which the lower surface of the thick-walled section 60 of the diaphragm 58 is seated, is formed at a substantially central portion of the first valve body 18. A hole 70, which has its diameter gradually decreased downwardly, is formed under the seat section 68. A ring-shaped elastic member 72, which is made of, for example, a rubber material, is provided to make engagement at the upper surface of the thin-walled section 62 of the diaphragm 58.

The piston 64, which is slidably displaceable in the vertical direction along the inner wall surface of the second valve body 24 in accordance with the pressure fluid supplied from any one of the pair of pressure fluid inlet/outlet ports 22a, 22b, is provided at a substantially central portion of the second valve body 24. A flange 74, which has its diameter increased in the radially outward direction, is formed at the upper portion of the piston 64. A piston packing 76 is installed to the outer circumferential surface of the flange 74. A pair of ring-shaped seal members 80a, 80b are installed to the outer circumferential surface of a rod 78 of the piston 64 by the aid of annular grooves.

A first chamber 82, which is closed by the cover member 26, is formed over the flange 74 of the piston 64. The first chamber 82 is provided to make communication with the first pressure fluid inlet/outlet port 22a. A pair of spring members 84a, 84b, which have mutually different diameters, are inserted between the flange 74 and the cover member 26. The piston 64 is urged downwardly by the resilient force of the spring members 84a, 84b so that the piston 64 is normally seated on the seat section 68. A plurality of projections 86, which abut against the flange 74 when the piston 64 is moved upwardly, are formed while being separated from each other by predetermined angles on the lower surface of the cover member 26.

A second chamber 88, which is closed by the inner wall surface of the second valve body 24, is formed under the flange 74. The second chamber 88 is provided to make communication with the second pressure fluid inlet/outlet port 22b. An elastic member 90, which abuts against the flange 74 to absorb the shock when the piston 64 is moved downwardly, is installed to the inner wall surface of the second valve body 24.

A holding member 92, which is open increasingly in a trumpet-shaped configuration, is fixed to the lower end of the piston 64. The holding member 92 functions to make engagement with the upper surface of the elastic member 72 so that the elastic member 72 is held with respect to the thin-walled section 62 of the diaphragm 58.

A third chamber 94, which is closed by the inner wall surface of the second valve body 24 and the diaphragm 58, is formed at the inside of the second valve body 24. The third chamber 94 is formed to make communication with a supply/discharge port 96 via a passage. In this arrangement, when the diaphragm 58 is displaced in the vertical direction integrally with the piston 64, then the air in the third chamber 94 is discharged to the atmospheric air through the supply/discharge port 96, or the air is supplied from the outside into the third chamber 94.

The ON/OFF valve 10, to which the structure of the fluid passage output port of the fluid-operated apparatus according to the embodiment of the present invention is applied, is basically constructed as described above. Next, its operation, function, and effect will be explained.

At first, the piping operation will be explained.

The pair of fluid passage output members 12a, 12b, which are formed separately from the first valve body 18, are screwed and fastened to the pair of holes 44 formed at the side surface of the first valve body 18 respectively. In this procedure, the fluid passage output member 12a, 12b is screwed until the tapered surface 38 of the fluid passage output member 12a, 12b makes the pressed contact with the inclined surface 50 of the first valve body 18 in accordance with the meshing action of the male thread 32 and the female thread 42.

Therefore, the inclined surface 50 of the first valve body 18 and the tapered surface 38 of the fluid passage output member 12a, 12b make the pressed contact to form the primary seal portion 52. Further, the wall surface of the annular stepped section 46 of the first valve body 18 and the annular projection 36 of the fluid passage output member 12a, 12b make the pressed contact to form the secondary seal portion 54. The sealing function is effected in accordance with the cooperating action of the primary seal portion 52 and the secondary seal portion 54. Owing to the sealing function, the pressure fluid flowing through the fluid passage 16 is reliably prevented from any leakage to the outside.

The fluid passage output member 12a, 12b is tightly fastened by fitting the male thread 32 and the female thread 42 to one another. Therefore, the joining strength is not decreased even when any load is applied to the fluid passage output member 12a, 12b.

Next, explanation will be made for a case of use in which a tube joint 98 is connected to the port 28 of the fluid passage output member 12a, 12b by the aid of an unillustrated jig.

Figure 4:
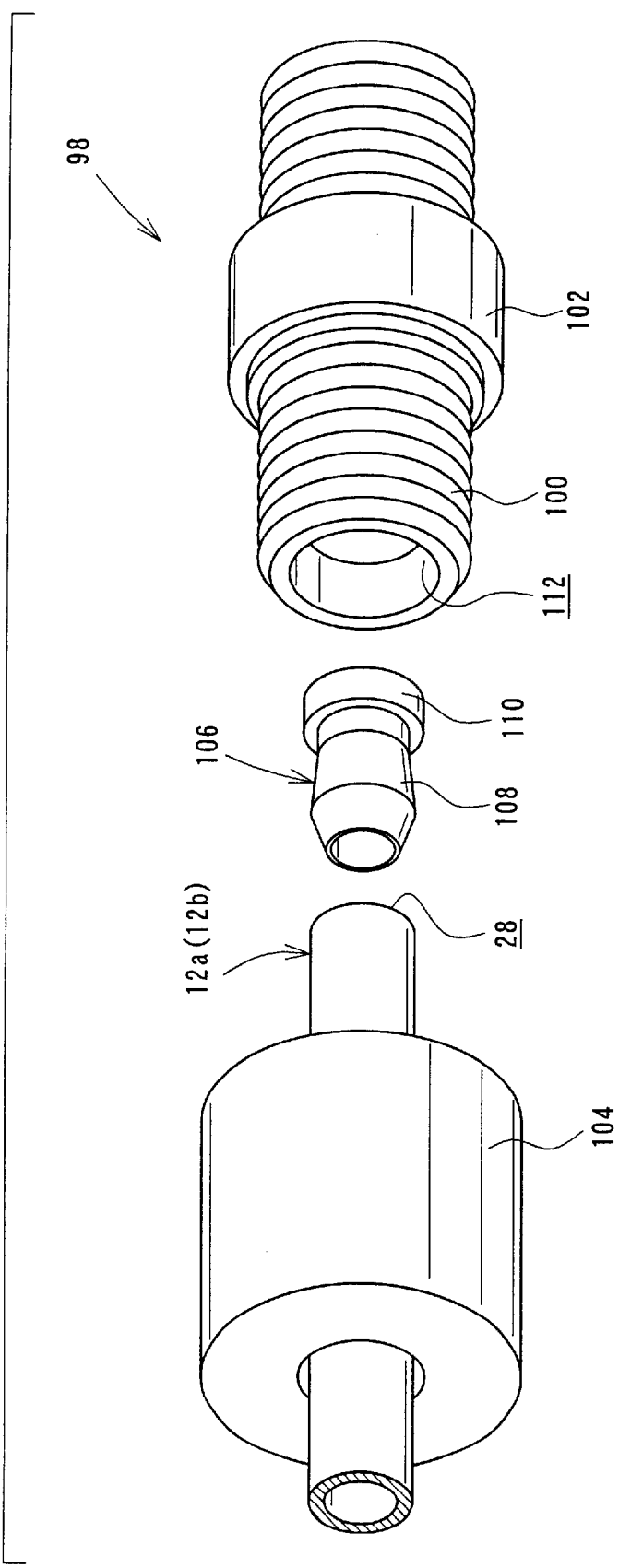
FIG. 4 shows an exploded perspective view illustrating a state in which a tube joint is connected to the fluid passage output member.

As shown in FIG. 4, the tube joint 98 includes a joint body 102 which has a through-hole formed in the axial direction to function as a fluid passage and which has a male thread 100 formed on its outer circumferential surface; a nut member 104 which holds the fluid passage output member 12a with respect to the joint body 102 by meshing an unillustrated female thread formed on its inner circumferential surface with the male thread 100 to make fitting to the first end of the joint body 102; and an insert bush 106 which has its part to be inserted and fitted to the port 28 of the fluid passage output member 12a.

The insert bush 106 includes an insert section 108 which is formed to have an annular configuration with a ridge-shaped cross section by being expanded in the outer circumferential direction and which is inserted into the port 28 of the fluid passage output member 12a; and an annular expanded section 110 which is formed integrally with the insert section 108 and which protrudes outwardly from the end of the fluid passage output member 12a.

When the tube joint 98 is inserted into the fluid passage output member 12a, the insert section 108 of the insert bush 106 is forcibly inserted into the port 28 of the fluid passage output member 12a by using the unillustrated jig. As a result, the diameter of the end of the fluid passage output member 12a is enlarged along the shape of the insert section 108. The inner circumferential surface of the fluid passage output member 12a and the outer circumferential surface of the insert section 108 are held in a liquid-tight manner.

Subsequently, the end of the fluid passage output member 12a, into which the insert bush 106 has been forcibly inserted, is inserted along an opening 112 of the joint body 102. The unillustrated female thread of the nut member 104 which is loosely fitted to the fluid passage output member 12a beforehand is screwed along the male thread 100 of the joint body 102 to tighten the nut member 104. Thus, the tube joint 98 is connected to the end of the fluid passage output member 12a.

Reference may be made to Japanese Laid-Open Patent Publication No. 10-267176 filed by the present applicant for details of the tube joint 98.

Next, the operation of the ON/OFF valve 10 will be explained.

The pressure fluid (for example, compressed air) is supplied from the second pressure fluid inlet/outlet port 22b, and the pressure fluid is introduced into the second chamber 88 disposed on the lower side of the flange 74. In this situation, the first pressure fluid inlet/outlet port 22a is in the state of being communicated with the atmospheric air.

The piston 64 is pressed upwardly in accordance with the action of the pressure fluid introduced into the second chamber 88. The piston 64 is moved upwardly against the resilient force of the spring members 84a, 84b. Therefore, the diaphragm 58, which is connected to the lower end of the piston 64, is moved upwardly integrally with the piston 64. The diaphragm 58 is separated from the seat section 68 to give the ON state. As a result, the pressure fluid flows along the fluid passage 16 through the gap between the diaphragm 58 and the seat section 68.

When the supply of the pressure fluid is switched to supply the pressure fluid to the first chamber 82 disposed on the upper side of the flange 74, the piston 64 and the diaphragm 58 are moved downwardly in an integrated manner in accordance with the resilient force of the spring members 84a, 84b. The diaphragm 58 is seated on the seat section 68, and thus the OFF state is given.

In the embodiment of the present invention, the fluid passage output members 12a, 12b are formed separately from the first valve body 18. The fluid passage output members 12a, 12b are detachably provided by being screw-fastened to the holes 44 of the first valve body 18. Therefore, in the embodiment of the present invention, it is unnecessary to perform the cutting machining operation. Accordingly, no burr or the like is generated. Further, no recess is formed, which would otherwise behave as any liquid pool depending on the surface roughness.

In the embodiment of the present invention, the fluid passage output member 12a, 12b is supported by meshing and screw-fastening the female thread 42 formed on the inner circumferential surface of the hole 44 of the first valve body 18 and the male thread 32 of the fluid passage output member 12*a*, 12*b*. Therefore, it is possible to avoid the inconvenience of the occurrence of the shortage of the connecting strength and the deterioration of the durability.

In the embodiment of the present invention, for example, when the tube joint 98 is connected as described above, for example, when the insert bush 106 is inserted into the port 28 of the fluid passage output member 12*a*, 12*b*, then it is unnecessary to exchange the entire fluid-operated apparatus, even if the end portion of the fluid passage output member 12*a*, 12*b* is deformed or damaged by any mistake. It is enough to merely make exchange with the new fluid passage output member 12*a*, 12*b*. Therefore, it is possible to shorten the exchange operation time, it is possible to improve the operation efficiency, and it is possible to reduce the cost.

Figure 5:
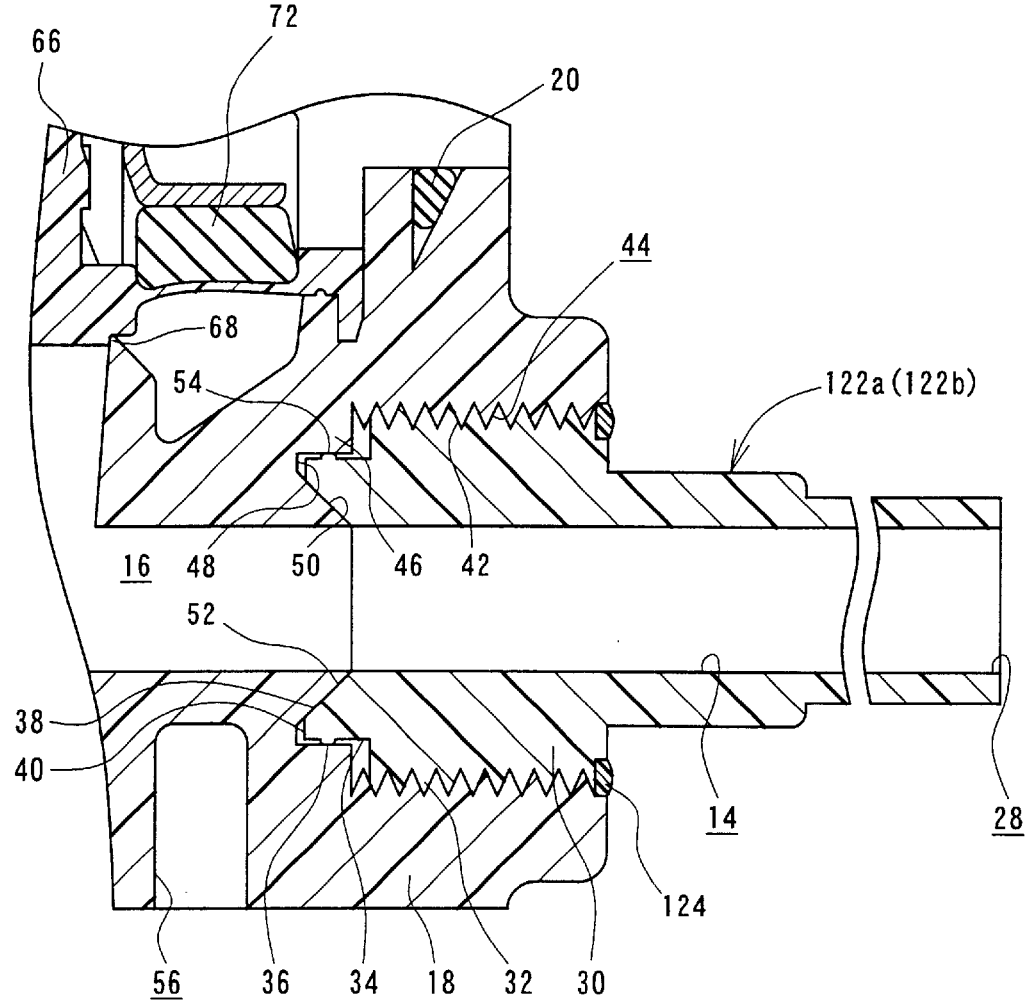
FIG. 5 shows, with partial omission, a magnified vertical sectional view illustrating a fluid passage output member to which a structure of a fluid passage output port of a fluid-operated apparatus according to another embodiment of the present invention is applied.
Figure 6:
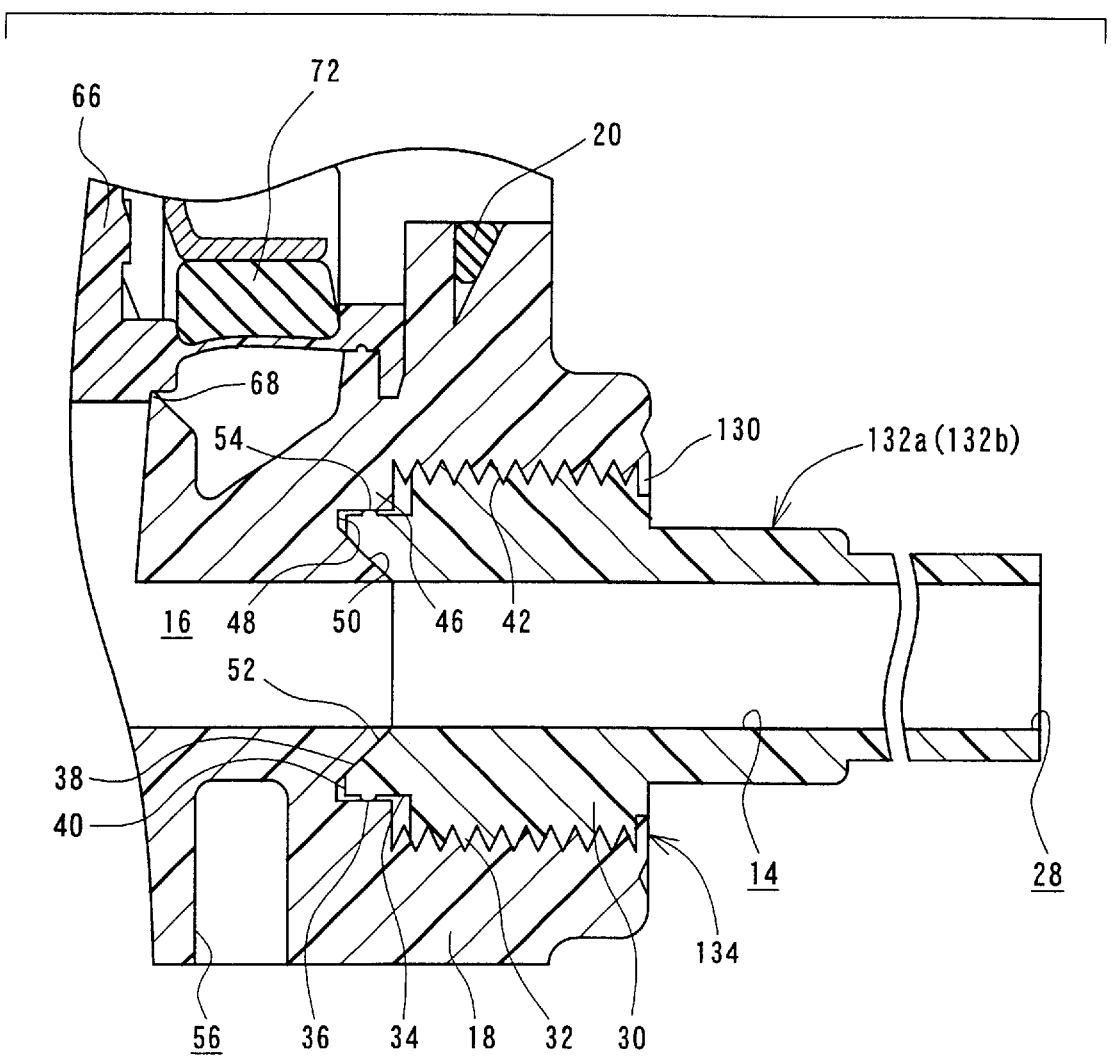
FIG. 6 shows, with partial omission, a magnified vertical sectional view illustrating a fluid passage output member to which a structure of a fluid passage output port of a fluid-operated apparatus according to still another embodiment of the present invention is applied.
Figure 7:
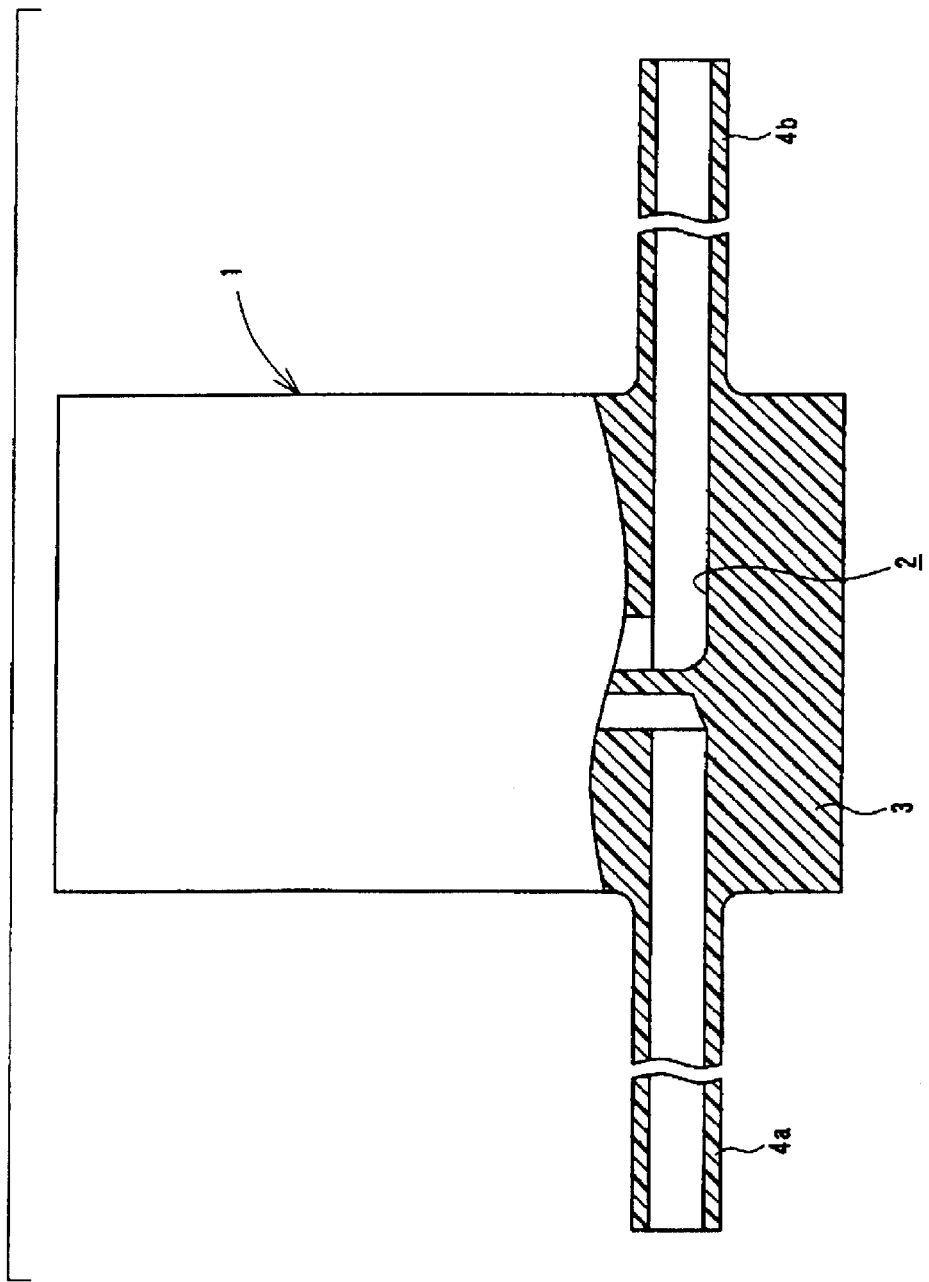
FIG. 7 shows a partial vertical sectional view illustrating a structure of a fluid passage output port of a fluid-operated apparatus concerning the conventional technique.
Figure 8:
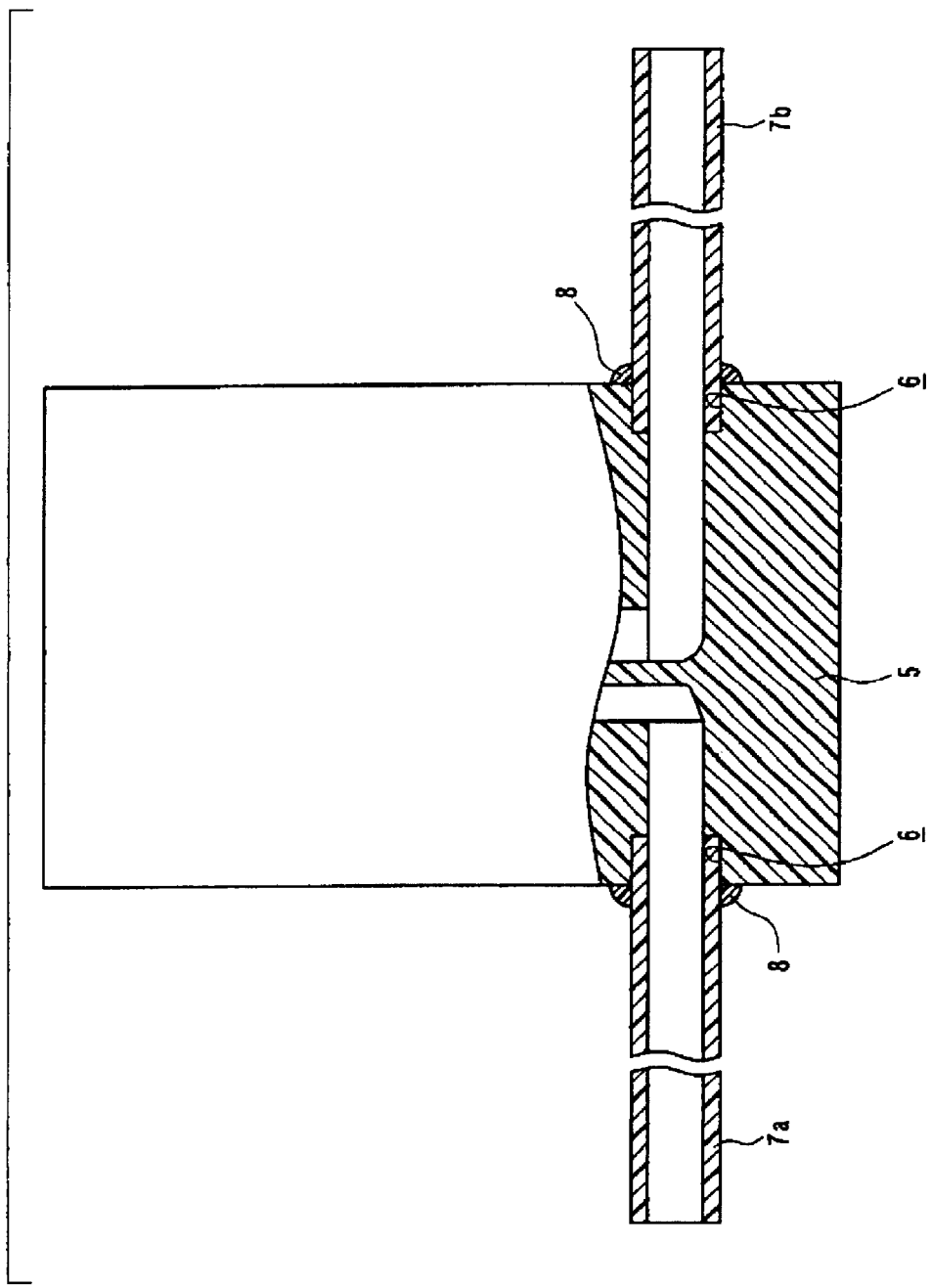
FIG. 8 shows a partial vertical sectional view illustrating a structure of a fluid passage output port of a fluid-operated apparatus concerning another conventional technique.

Next, structures of fluid passage output ports of fluid-operated apparatuses according to other embodiments are shown in FIGS. 5 and 6.

In the structure of the fluid passage output port of the fluid-operated apparatus shown in FIG. 5, the annular bulge 30 of the fluid passage output member 122*a*, 122*b* and the first valve body 18 are welded with a resin material, and thus a resin-welded section 124 is formed. Alternatively, in the structure of the fluid passage output port of the fluid-operated apparatus shown in FIG. 6, a fluid passage output member 132*a* (132*b*) is screwed and fastened to the hole 44 of the first valve body 18, and then an annular projection 130 of the first valve body 18 is pressed and caulked to surround the outer circumferential surface of the fluid passage output member 132*a*, 132*b*. Thus, a caulked section 134 is formed.

When the resin-welded section 124 or the caulked section 134 is formed as described above, then the screw-fastened fluid passage output member 122*a*, 122*b*, 132*a*, 132*b* is prevented from any loosening of screw, and it is possible to exhibit the sealing function as a tertiary seal portion.

When the load is applied to the fluid passage output member 122*a*, 122*b*, 132*a*, 132*b*, the load is scattered to the screw section and the resin-welded section 124 (or the caulked section 134). Therefore, it is possible to avoid any fear of crack, breakage and the like which would be otherwise caused by any deformation of the fluid passage output member 122*a*, 122*b*, 132*a*, 132*b*.

What is claimed is:

1. A structure of a fluid passage output port of a fluid-operated apparatus, comprising:

a body composed of a resin material and formed with a fluid passage for allowing a fluid to flow therethrough; and a fluid passage output member formed integrally of a resin material to have a substantially cylindrical configuration separately from said body, said fluid passage output member comprising a threaded annular bulging section screwed into a hole of said body by the aid of threads formed on said annular bulging section;

a primary seal comprising a tapered surface on a first end of said fluid passage output member, an extension of said tapered surface intersecting an axis of said fluid passage output member, and an annular inclined surface in said hole of said body, wherein said primary seal is formed by allowing said annular inclined surface and said tapered surface to make pressed contact with each other when said fluid passage output member is screwed into said hole of said body; and a secondary seal comprising an annular projection on said first end of said fluid passage output member, a surface of which is concentric and substantially parallel to said axis of said fluid passage output member, and an annular stepped section in said hole of said body, wherein said secondary seal is formed by allowing said surface of said annular projection to make pressed contact with a wall surface of said annular stepped section when said fluid passage output member is screwed into said hole of said body.

2. The structure of said fluid passage output port of said fluid-operated apparatus according to claim 1, wherein a resin-welded section, at which a resin material is welded, is formed between an outer circumferential surface of said fluid passage output member and said body.

3. The structure of said fluid passage output port of said fluid-operated apparatus according to claim 1, wherein a caulked section, which surrounds an outer circumferential surface of said fluid passage output member, is formed by pressing an annular projection of said body.

4. The structure of said fluid passage output port of said fluid-operated apparatus according to claim 1, wherein a tube joint is connected to a second end portion of said fluid passage output member, said tube joint comprising:

a joint body which has a screw section formed on its outer circumferential surface;

a nut member which has a screw section for meshing with said screw section of said joint body, formed on its inner circumferential surface; and an insert bush, a part of which is forcibly inserted into a port formed at said second end portion of said fluid passage output member.

* * * * *